United States Patent [19]

Cyr

[11] Patent Number: 4,854,463
[45] Date of Patent: Aug. 8, 1989

[54] POTATOE DRAWER

[76] Inventor: Michel L. Cyr, 1228, L'Achigan Nord, L'Epiphanie, Canada, J0K 1J0

[21] Appl. No.: 105,208

[22] Filed: Oct. 7, 1987

[51] Int. Cl.$^4$ .................. B65D 85/52; B65D 51/04
[52] U.S. Cl. .................... 220/18; 220/20.5; 222/457
[58] Field of Search ............ 119/52 R; 209/259; 217/40, 42; 220/2, 18, 20.5; 221/312 A, 312 B, 312 C; 222/130, 457; 232/43.1, 43.2, 43.5; 312/210.5

[56] References Cited

U.S. PATENT DOCUMENTS

| 250,159 | 11/1881 | Mills | 222/457 |
|---|---|---|---|
| 488,807 | 12/1892 | Hagler | 312/210.5 |
| 493,227 | 3/1893 | Boardman | 119/52 R |
| 886,806 | 5/1908 | Hoffman | 119/52 R |
| 998,410 | 7/1911 | Sexton | 119/52 R |
| 1,150,317 | 8/1915 | Timmons | 222/457 |
| 1,402,462 | 1/1922 | Wernz | 222/457 |
| 1,566,545 | 12/1925 | Larson | 222/457 |
| 1,660,284 | 2/1928 | Waters | 222/457 |
| 2,329,758 | 9/1943 | Hamlin | 217/40 |
| 3,665,114 | 4/1972 | Turner | 217/42 |

Primary Examiner—Jimmy G. Foster
Attorney, Agent, or Firm—Roland L. Morneau

[57] ABSTRACT

This invention consists of a container inside which potatoes or other vegetables or food may be kept until eaten within a short term. This parallelepiped-shaped container is a one-piece device provided with three different openings: there is one on the upper part of the container, one on the front part and a third one on the lower part. The three openings are themselves provided with three identical covers. The appropriate shape of the container provides a good rotation and ventilation of vegetables. Also, a plastic screen situated on the lower part of the container permits the filtration of vegetable deposits, which may be removed by opening the bottom cover.

8 Claims, 1 Drawing Sheet

POTATOE DRAWER

BACKGROUND OF THE INVENTION

This invention primarily consists of a container inside which potatoes (or other vegetables as onions) can be kept.

Usually, potatoes are kept either in their original container (usually in a bag) or any dish whatsoever. In both cases, the only opening provided is situated on the upper part of the container. Therefore, the excess of vegetable deposits, which may be accumulated in the bottom of the containers, as well as the moisture produced by the unappropriate ventilation of the containers may cause germination. Also, if fresh potatoes are added to those left in the container, then there is no rotation of vegetables, which may then be subject to rot. Furthermore, these usual containers cannot be easily cleaned out and, if not covered, the potatoes are then exposed to daylight, which may be harmful to their freshness. In short, it can be said that previous containers were unpleasant to use and unattractive. Furthermore, because of their design, they often had to be positioned in hard to reach locations such as under the cupboard or the table.

I have found that these disadvantages may be overcome by designing a container provided with three openings. Each of the openings is itself provided with a cover permitting the circulation of air. This container can be easily installed in a kitchen. Potatoes may be tipped into the container by the upper opening and taken out by the front opening. With this rotating action, potatoes are never left in the bottom of the container. Vegetables deposits are accumulated in the bottom of the container by passing through a plastic screen. The container may be cleaned out by opening the bottom cover without removing the potatoes.

Each cover is larger than its opening, which provides ventilation from every side of the container, even from the back, which does not touch the wall and is provided with small apertures permitting further ventilation. The container is opaque, which prevents the potatoes from turning green because of daylight. Because of its attractive look, the container may be well installed within the user's reach. It is also easier to clean and to use than usual containers, which until now were not specially designed for potatoes. Another important feature of this invention is that the core of the receptacle can be molded in one single piece and that the three covers are identical therefore allowing for inexpensive manufacturing.

SUMMARY OF THE INVENTION

The container for storing and dispensing potatoes and the like according to the invention is generally upright and has a rectangular cross-section. The upper end of the container forms an opening for receiving the potatoes and is provided with a cover hinged along the rear face of the container. The lower end of the container forms a second opening forwardly slanted which is closed by a screen having large apertures.

An apron projects forwardly and upwardly from the screen. A cover is hingedly mounted about the rear face for closing the lower end of the container with the screen. The apron and the front face define a front opening having a forwardly slanted orientation. A cover hingingly mounted about the front face for closing the front opening is forwardly and downwardly slanted. The front opening projects vertically above the front part of the screen.

DESCRIPTION OF THE DRAWINGS

FIG. 3 illustrates an other embodiment of the invention, wherein a receptacle is positionned at the bottom of the drawer, and FIG. 4 illustrates an other embodiment of the invention with its covers opened, a cut-out and a flat base comprising a slidable receptacle.

DETAILED DESCRIPTION OF THE DRAWINGS

Figures 1, 1A:
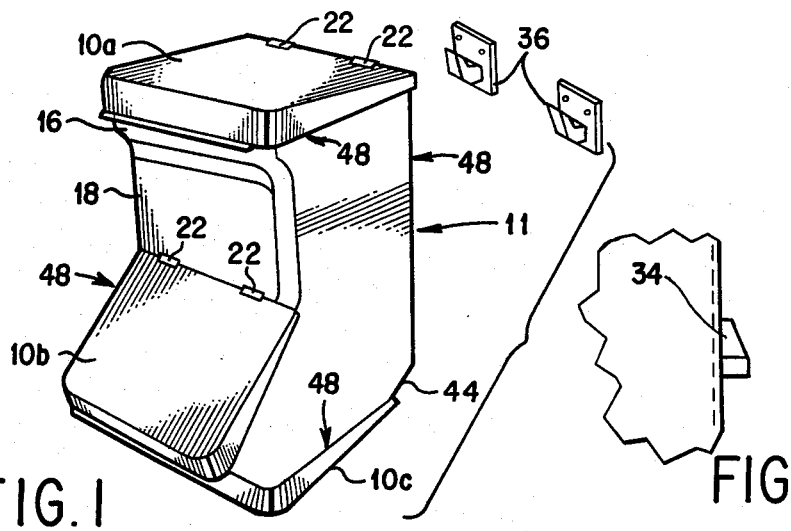
FIG. 1 is a schematic perspective view of the invention.
FIG. 1a is a perspective view of a portion of a side view illustrating a spacer fixed on the back face of the container.
Figures 2, 2A:
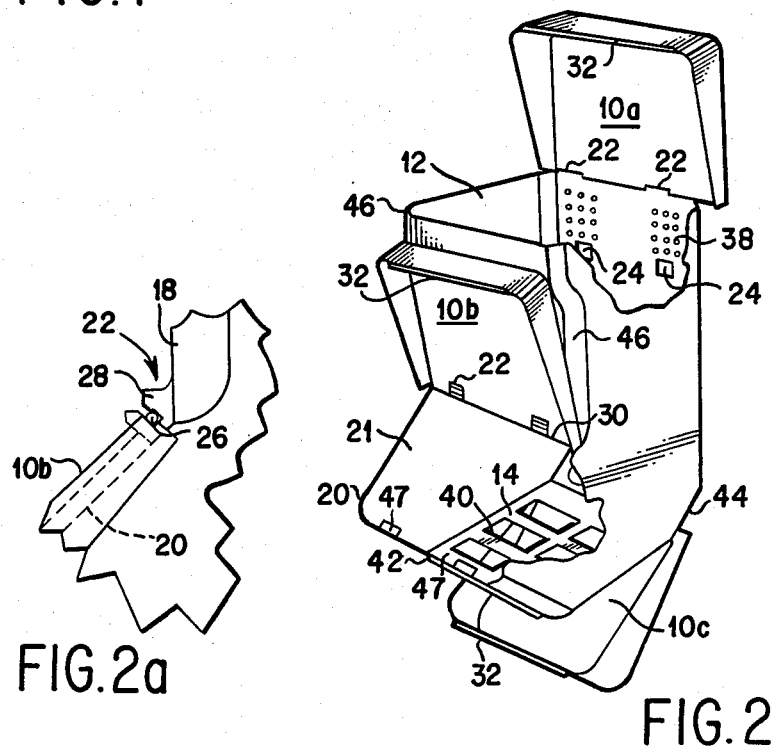
FIG. 2 is a schematic perspective view of the invention with its covers opened and a cut-out illustrating the bottom screen.
FIG. 2a is a sectional view along line A—A of FIG. 2.

As illustrated in FIGS. 1 and 2, the container 11 is a generally upright tubular box having a rectangular cross-section and which is provided with three covers 10a, 10b and 10c especially designed to store and dispense potatoes and the like. Potatoes are tipped into the container 11 through the upper opening 12 and falls down on the plastic screen 14 forming the bottom part of the box.

The upper front face 16 of the container 11 is slightly curved forwardly to widen the opening 12 so that the potatoes can easily be tipped from a bag into the container 11. The central part 18 of the front face is narrower than the upper front face 16 and the lower front part or apron 20 slightly projected forwardly and upwardly to provide a front opening 21 in order for the user to have better access to the potatoes resting on the screen 14. The lower part 44 of the back face of the container is slightly curved forwardly and downwardly in order to direct the potatoes towards the screen 14 below the opening 12. The three covers 10a, 10b and 10c of the container 11 are mounted on a pair of hinges 22 so as to allow the opening of the covers from the front. The container 11 with its covers is formed of plastic, metal or other suitable materials.

All the covers are mounted in the same manner with back hinges 22. The hinges are provided with a male rod member 26 forming an integral part of the cover on the back of the cover. The male member 26 fits into a corresponding female grooved member 28 secured on the box of the container. As shown in FIG. 2a, the hinge 22 supports the cover 10b in a spaced relationship with the apron 20 which explains, in part, the circulation of air between the box of the container and the covers. The particular shape of the three covers 10 has been designed to facilitate their opening. They are formed by a rectangular panel having a front and two side ledges pending from the panel. The rear of the panel has no ledge. A small strip 32 provided on the front ledge of the three covers 10 is used to open the covers more easily. The container is supported by two hangers 36 fixed on a wall and adapted to grip into the holes 24. Two spacers 34 secured at the loewr end of the back face of the container prevent the container from touching the wall holding the hangers. Air may therefore circulate more easily through the perforations 38 in the back face of the container 11. The container 11 illustrated in FIGS. 2 and 3 is provided with a lower opening closed by a plastic screen 14 having rectangular openings 40 therethrough.

The bottom cover 10c can be easily closed by pressing it on the container's bottom strip 42 . This arrangement provides a snapping action. The lower part 44 of the container's back face is inclined for preventing the potatoes from jamming behind the screen 14. The bottom screen 14 is also slightly inclined at the front in order to facilitate the falling of potatoes down the container below the opening 21. The intersection 46 of the sides of the container are rounded for an easier cleaning.

The container is always well ventilated owing to a plurality of perforations 38 on the back face of the container 11 as well as to the air gaps provided between the box and each of the covers 10 which are larger than their respective openings. The front cover 10b when closed rests on two small prongs 47 providing a better circulation of air. Reference number 48 generally represents these locations through which ventilation is obtained.

The container 11 is used to store and dispense potatoes or the like. The potatoes which have been first placed in the container are first to be picked up through the front opening 21. The screen 14 allows the undesired vegetable refuse to fall into the cover 10c, therefore, maintaining the potatoes free of dirt or other deposits. Such deposits can be removed easily by lowering the cover 10c and cleaning the latter.

The embodiment illustrated in FIG. 3 shows an alternative way to clean the container. A receptacle 50 is installed on the whole surface of the bottom of the container to prevent vegetable deposits from accumulating directly in the container. The receptacle 50 is removable to be cleaned out. For a better and longer use, a reusable plastic plate is contemplated. The container may also be used without a plate.

The embodiment illustrated in FIG. 4 shows a third way to clean the container. The container is provided with a flat base 52 in order to be placed on a kitchen counter. The vegetable refuse is accumulated in a drawer 53, which may be removed from the container to be cleaned out. This container may also be hung on a wall the same way as in FIGS. 1 and 2.

A circulation of air from bottom to top is not hindered due to the hinged covers which are larger than their respective openings and to the perforated screen 14.

The shape of the container is preferably designed with equal size top, front and bottom openings so that only one mold may be used to produce identical covers 10a, 10b and 10c.

I claim:

1. A generally upright container for storing and dispensing potatoes and the like having a substantially rectangular cross-section, the said container having a front and a rear face, said rear face having means for hanging the container on a wall, the said container having a substantially horizontal opening at its upper end and a first hinged cover for closing said horizontal opening, a bottom opening at the lower end of said container said bottom opening being forwardly slanted, a screen extending across said bottom opening, said screen having large apertures, a second cover for closing said bottom opening, said second cover being hingingly mounted adjacent said rear face, an apron extending upwardly and forwardly from said screen for defining a forwardly slanted front opening with the front face of the container, said front opening giving access to said screen and vertically located above the front part of said screen, a third cover hingingly mounted about said front face for closing said front opening projects forwardly and downwardly, whereby the potatoes introduced in the upper opening falls on the screen and are adapted to roll below the front opening.

2. A generally upright container as recited in claim 1, wherein the first, second and third covers are larger than the horizontal, bottom and front openings respectively for allowing ventilation inside the container.

3. A generally upright container as recited in claim 2, wherein the front opening has edges provided with projecting prongs for spacing said third cover from said edges to allow air to enter said third opening.

4. A generally upright container as recited in claim 1, wherein a means is provided for fastening closed the second cover.

5. A generally upright container as recited in claim 1, wherein the lower part of the rear face is slanted forwardly and downwardly for allowing the potatoes to roll towards the screen and below the front opening.

6. A generally upright container as recited in claim 1, wherein the first, second and third covers comprise a rectangular panel and three ledges projecting downwardly from said panel on the front side and on the two sides adjacent the front side, the said cover being hingely mounted along its side free from ledges.

7. A generally upright container as recited in claim 1, wherein the three covers are hingingly connected to the container by a pair of female grooved members secured to the container adjacent each opening and a pair of male rod members secured to each cover and adapted to rotatably move in said grooved member.

8. A generally upright container as recited in claim 1, wherein the rear face is provided with perforations for allowing air circulation therethrough.

* * * * *